US012652439B2

(12) United States Patent　　　　(10) Patent No.:　US 12,652,439 B2
Wilkinson　　　　　　　　　　　　(45) Date of Patent:　Jun. 9, 2026

(54) SYSTEMS AND METHODS FOR DETECTING A REACTION BY A USER TO A MEDIA ASSET TO WHICH THE USER PREVIOUSLY REACTED AT AN EARLIER TIME, AND RECOMMENDING A SECOND MEDIA ASSET TO THE USER CONSUMED DURING A RANGE OF TIMES ADJACENT TO THE EARLIER TIME

(71) Applicant: Adeia Guides Inc., San Jose, CA (US)

(72) Inventor: James Matthew Wilkinson, London (GB)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/663,940

(22) Filed: May 14, 2024

(65) Prior Publication Data

US 2024/0305859 A1　　Sep. 12, 2024

Related U.S. Application Data

(63) Continuation of application No. 17/968,023, filed on Oct. 18, 2022, now Pat. No. 12,015,827, which is a
(Continued)

(51) Int. Cl.
　　*H04N 21/466*　　　(2011.01)
　　*H04L 67/306*　　　(2022.01)
　　　　　　　(Continued)

(52) U.S. Cl.
　　CPC ....... *H04N 21/4668* (2013.01); *H04L 67/306* (2013.01); *H04L 67/535* (2022.05);
　　　　　　　(Continued)

(58) Field of Classification Search
　　CPC ............ H04N 21/4668; H04N 21/251; H04N 21/26258; H04N 21/422; H04N 21/42201;
　　　　　　　(Continued)

(56) References Cited

U.S. PATENT DOCUMENTS 8,260,657　B1 *　9/2012　Conway ............. H04N 21/2543
　　　　　　　　　　　　　　　　　705/28
8,704,068　B2　　4/2014　Bowen
　　　　　　　(Continued)

FOREIGN PATENT DOCUMENTS

EP　　　　2600300　A1　　6/2013
JP　　2012234405　A　*　11/2012

OTHER PUBLICATIONS

International Search Report and Written Opinion dated Nov. 2, 2017 for PCT Application No. PCT/US2017/048985, filed Aug. 29, 2017, 15 pages.

*Primary Examiner* — Cynthia M Fogg
(74) *Attorney, Agent, or Firm* — HG LAW LLP

(57)　　　　ABSTRACT

Systems and methods are disclosed herein for detecting a first reaction by a user when consuming a media asset at a first time, where a first magnitude of the first reaction exceeds a first threshold. The systems and methods may determine whether a second reaction by the user occurred when the user consumed the media asset at a second time that is prior to the first time, where a second magnitude of the second reaction exceeds a second threshold, and may recommend the second media asset to the user.

20 Claims, 7 Drawing Sheets

Related U.S. Application Data continuation of application No. 17/010,082, filed on Sep. 2, 2020, now Pat. No. 11,509,964, which is a continuation of application No. 15/442,234, filed on Feb. 24, 2017, now Pat. No. 10,798,451.

(51) Int. Cl.

| | |
|---|---|
| *H04L 67/50* | (2022.01) |
| *H04N 21/25* | (2011.01) |
| *H04N 21/262* | (2011.01) |
| *H04N 21/422* | (2011.01) |
| *H04N 21/4223* | (2011.01) |
| *H04N 21/442* | (2011.01) |
| *H04N 21/482* | (2011.01) |

(52) U.S. Cl.

CPC ..... *H04N 21/251* (2013.01); *H04N 21/26258* (2013.01); *H04N 21/422* (2013.01); *H04N 21/42201* (2013.01); *H04N 21/42203* (2013.01); *H04N 21/4223* (2013.01); *H04N 21/44204* (2013.01); *H04N 21/44218* (2013.01); *H04N 21/44226* (2020.08); *H04N 21/4667* (2013.01); *H04N 21/4826* (2013.01)

(58) Field of Classification Search

CPC ......... H04N 21/42203; H04N 21/4223; H04N 21/44204; H04N 21/44218; H04N 21/44226; H04N 21/4667; H04N 21/4826; H04N 21/47202; H04N 21/25891; H04N 21/4758; H04N 21/4825; H04N 21/4622; H04N 21/2665

USPC ........................................................ 725/12

See application file for complete search history.

(56) References Cited

U.S. PATENT DOCUMENTS

| | | | | |
|---|---|---|---|---|
| 9,055,343 | B1 * | 6/2015 | Lewis | H04N 21/25 |
| 9,244,441 | B2 | 1/2016 | Caskey et al. | |
| 9,602,606 | B2 | 3/2017 | Wheatley | |
| 10,798,451 | B2 | 10/2020 | Wilkinson | |
| 11,509,964 | B2 | 11/2022 | Wilkinson | |
| 2008/0134043 | A1 * | 6/2008 | Georgis | H04L 67/104 |
| | | | | 348/E7.071 |
| 2009/0271496 | A1 | 10/2009 | Nakamura et al. | |
| 2009/0317060 | A1 | 12/2009 | Han et al. | |
| 2009/0328100 | A1 | 12/2009 | Horiguchi | |
| 2010/0169153 | A1 | 7/2010 | Hwacinski et al. | |
| 2011/0126253 | A1 | 5/2011 | Roberts et al. | |
| 2012/0109345 | A1 | 5/2012 | Gilliland | |
| 2012/0324493 | A1 | 12/2012 | Holmdahl et al. | |
| 2013/0110772 | A1 | 5/2013 | Svendsen | |
| 2013/0167168 | A1 * | 6/2013 | Ellis | H04N 21/458 |
| | | | | 725/12 |
| 2014/0088952 | A1 | 3/2014 | Fife et al. | |
| 2014/0277649 | A1 * | 9/2014 | Chong | G06F 16/90324 |
| | | | | 700/94 |
| 2014/0281971 | A1 | 9/2014 | Isbell et al. | |
| 2015/0074534 | A1 * | 3/2015 | Didomenico | G06F 3/0481 |
| | | | | 715/719 |
| 2015/0135225 | A1 * | 5/2015 | Bayer | G06F 16/738 |
| | | | | 725/46 |
| 2015/0143392 | A1 | 5/2015 | Silveira-Filho et al. | |
| 2016/0371257 | A1 * | 12/2016 | Nishimura | H04N 21/44226 |
| 2017/0199874 | A1 * | 7/2017 | Patel | H04W 4/023 |
| 2018/0032997 | A1 * | 2/2018 | Gordon | G06Q 30/0269 |
| 2018/0249215 | A1 | 8/2018 | Wilkinson | |
| 2020/0184843 | A1 | 6/2020 | Yoshikawa et al. | |
| 2023/0148284 | A1 | 5/2023 | Wilkinson | |

* cited by examiner

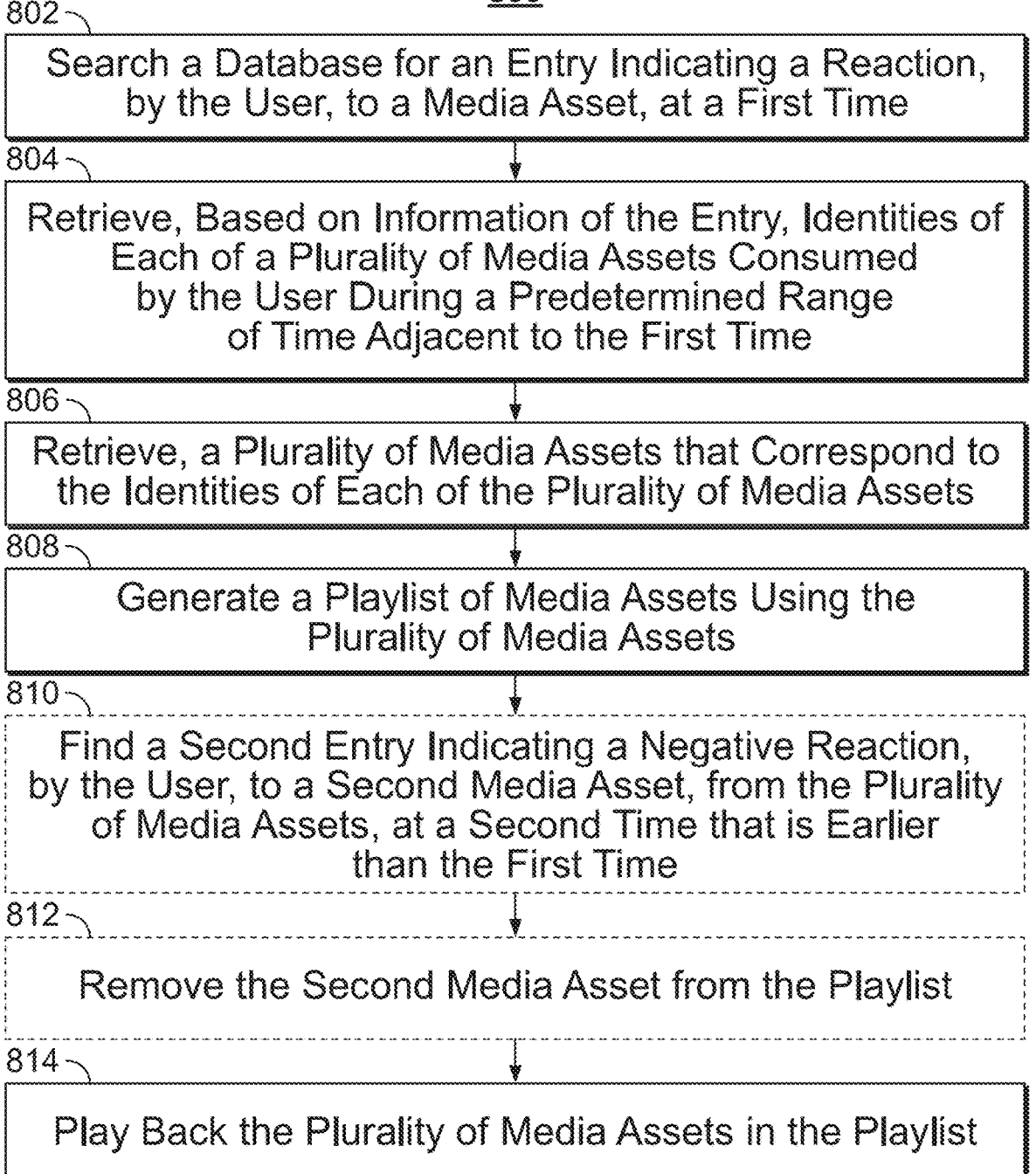

800

802
Search a Database for an Entry Indicating a Reaction,
by the User, to a Media Asset, at a First Time 804
Retrieve, Based on Information of the Entry, Identities of
Each of a Plurality of Media Assets Consumed
by the User During a Predetermined Range
of Time Adjacent to the First Time 806
Retrieve, a Plurality of Media Assets that Correspond to
the Identities of Each of the Plurality of Media Assets 808
Generate a Playlist of Media Assets Using the
Plurality of Media Assets 810
Find a Second Entry Indicating a Negative Reaction,
by the User, to a Second Media Asset, from the Plurality
of Media Assets, at a Second Time that is Earlier
than the First Time 812
Remove the Second Media Asset from the Playlist 814
Play Back the Plurality of Media Assets in the Playlist

FIG. 8

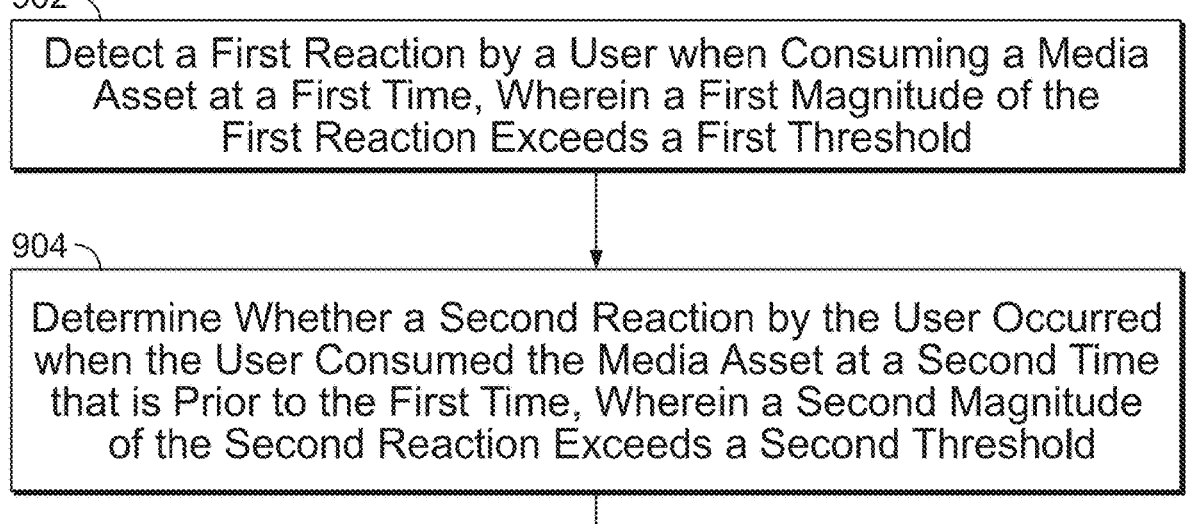

900

902 — Detect a First Reaction by a User when Consuming a Media Asset at a First Time, Wherein a First Magnitude of the First Reaction Exceeds a First Threshold 904 — Determine Whether a Second Reaction by the User Occurred when the User Consumed the Media Asset at a Second Time that is Prior to the First Time, Wherein a Second Magnitude of the Second Reaction Exceeds a Second Threshold 906 — Recommend the Second Media Asset to the User

FIG. 9

SYSTEMS AND METHODS FOR DETECTING A REACTION BY A USER TO A MEDIA ASSET TO WHICH THE USER PREVIOUSLY REACTED AT AN EARLIER TIME, AND RECOMMENDING A SECOND MEDIA ASSET TO THE USER CONSUMED DURING A RANGE OF TIMES ADJACENT TO THE EARLIER TIME

CROSS REFERENCE TO RELATED APPLICATION

This application is a continuation of U.S. patent application Ser. No. 17/968,023, filed Oct. 18, 2022, which is a continuation of U.S. patent application Ser. No. 17/010,082, filed Sep. 2, 2020, now U.S. Pat. No. 11,509,964, which is a continuation of U.S. patent application Ser. No. 15/442,234, filed Feb. 24, 2017, now U.S. Pat. No. 10,798,451, the contents of which are hereby incorporated by reference herein in their entireties.

BACKGROUND

In related art systems, when a recommendation of a media asset is made based on a present positive reaction by a user to a presently playing media asset, the recommendation is based purely on attributes of the media asset itself. Thus, if a user is reacting to a media asset for reasons unrelated to the user's present enjoyment of the media asset (e.g., because it evokes a pleasant memory), and the user in fact does not particularly enjoy the media asset itself, the related art will nonetheless recommend, to the user, media assets that share attributes with the media asset that the user is unlikely to be interested in listening to.

SUMMARY

Systems and methods are provided herein for detecting a reaction by a user to a media asset to which the user previously reacted at an earlier time, and recommending a second media asset to the user based on other media assets consumed by the user during a range of times adjacent to the earlier time. For example, the user might be driving while listening to "Purple Haze" by Jimi Hendrix. A media guidance application may receive an input from a microphone indicating that the user reacted to the song. Further, the media guidance application may determine that the microphone captured the user laughing and that the laugh was loud enough to be considered a significant reaction from the user. The media guidance application may then look for an entry in the database that was recorded at an earlier time and that indicates that the user previously reacted when listening to "Purple Haze," and may determine that the user's previous reaction happened during his prom night and that "Hey Joe" by Jimi Hendrix played that night, after the playback of "Purple Haze." The systems and methods may then recommend to the user that he listen to "Hey Joe" in order to better recreate the emotional environment that the user was experiencing during his prom night.

In some aspects, the media guidance application may detect that a user consumed a media asset at a first time. For example, the media guidance application may determine that the user listened to "Purple Haze" by Jimi Hendrix. In some embodiments, the media guidance application may use a plurality of sensors (e.g., a microphone, a camera), to detect that the user is consuming a media asset. If the media guidance application detects an input from the sensors (e.g., the microphone detects a noise, the camera detects movement on the display), the media guidance application may query each of the devices available to the user to determine that the input from the sensor is due to a media asset being consumed and not due to ambient noise (e.g., a person speaking, a passing vehicle is blasting music).

In some embodiments, the media guidance application may, while detecting the first reaction by the user to the media asset while the media asset was consumed by the user at the first time, receive a communication, by the user, that corresponds to the media asset, at a third time that is later than the first time. For example, the media guidance application may receive the user's chat history. Further, the media guidance application may decompose the communication into a plurality of segments. For example, the media guidance application may decompose the chat history into sentences. Even further, the media guidance application may detect the first reaction based on a segment from the plurality of segments. For example, the media guidance application may detect that the user, in one of the sentences, mentioned that he really enjoyed listening to "Purple Haze."

In some embodiments, the media guidance application may detect a first reaction by the user to the media asset while the media asset was consumed by the user at the first time. For example, the media guidance application may detect an input from a microphone indicating a reaction from the user.

In some embodiments, the media guidance application may, in response to detecting the first reaction, determine a type of the first reaction. For example, the media guidance application may determine that the microphone registered the user laughing.

In some embodiments, the media guidance application may, while determining the type of the first reaction, determine a sensor type based on a sensor used to detect the first reaction. For example, the media guidance application may determine the sensor type as heartbeat because the sensor to detect the reaction was a heartbeat monitor. Further, the media guidance application may determine whether the sensor type corresponds to one reaction type, or to a plurality of candidate reaction types. For example, the media guidance application may determine that the heartbeat only corresponds to a heartbeat reaction while an input coming from a microphone can indicate laughing, screaming, or speech. Even further, the media guidance application may, in response to determining that the sensor type corresponds to one reaction type, determine the type of the first reaction based on the sensor type. For example, the media guidance application may determine that the sensor type is a heartbeat and may conclude that the reaction type is a heart rate reaction.

In some embodiments, the media guidance application may, in response to determining that the sensor type corresponds to a plurality of candidate reaction types, retrieve respective characteristics that correspond to each candidate reaction type of the plurality of candidate reaction types. For example, the media guidance application may determine that the sensor is a microphone that can indicate that the user is speaking, screaming, or laughing. Further, the media guidance application may compare characteristics of the first reaction to each respective characteristic of each candidate reaction type to determine a respective amount of matching characteristics for each respective candidate reaction type. For example, the media guidance application may compare the characteristics of the first reaction to the characteristics of samples of the user speaking, screaming and laughing. Even further, the media guidance application may determine the type of the first reaction to be the respective candidate reaction type that had the respective amount of matching characteristics that was a highest respective amount. For example, the media guidance application may conclude that the first reaction matches the laughing sample the best, and thus the media guidance application may determine the reaction to be laughing.

In some embodiments, the media guidance application may, in response to determining that the sensor type corresponds to a plurality of candidate reaction types, detect, using a different sensor from the sensor used to detect the first reaction, a third reaction by the user to the media asset while the media asset was consumed by the user at the first time. For example, the media guidance application may receive an input from a heart rate monitor. Further, the media guidance application may determine a sensor type of the different sensor. For example, the media guidance application may determine the sensor type as heartbeat because the sensor to detect the reaction was a heartbeat monitor. Even further, the media guidance application may determine the type of the first reaction based on the sensor type of the different sensor. For example, the media guidance application may determine, based on the microphone input and the heart rate monitor input, that the reaction is laughing.

In some embodiments, the media guidance application may convert a magnitude of the first reaction to a converted magnitude on a scale that corresponds to the type. For example, the media guidance application may convert the analog input of the sensor to a decibel scale to represent the loudness of the laugh.

In some embodiments, the media guidance application may, while converting the magnitude of the first reaction to the converted magnitude, retrieve the scale that corresponds to the type. For example, the media guidance application may, while converting the analog input from a microphone to an amplitude scale, retrieve the decibel scale and the level of analog input corresponding to a 0 decibel sound. Further, the media guidance application may determine whether a third reaction by the user to the media asset at a third time that is earlier than the first time and different from the second time, where the third reaction had a respective converted magnitude exceed a respective threshold, occurred. For example, the media guidance application may determine that the user was already laughing even before the user started listening to "Purple Haze." Even further, the media guidance application may, in response to determining that the third reaction occurred, adjust the scale based on the third reaction, and may determine the converted magnitude of the first reaction based on the first reaction and the adjusted scale. For example, the media guidance application may adjust the scale for the loudness of the laugh to be measured at—the laugh has to be louder to be considered a sufficient reaction from the user.

In some embodiments, the media guidance application may then determine whether the converted magnitude is greater than a threshold value on the scale that corresponds to the type. For example, the media guidance application may determine that the laugh was loud enough to be considered a substantial reaction from the user.

In some embodiments, the media guidance application may, in response to determining that the converted magnitude is greater than the threshold value on the scale that corresponds to the type, search a database for an entry indicating a second reaction, by the user, to the media asset, at a second time that is earlier than the first time. For example, the media guidance application may search for a time in the past when the user reacted while listening to "Purple Haze."

In some embodiments, the media guidance application may, in response to determining that the converted magnitude is greater than the threshold value on the scale that corresponds to the type, store the first reaction in a data structure. For example, the media guidance application may store the characteristics of the user's laugh in a database. Further, the media guidance application may store the first time in the data structure. For example, the media guidance application may store the time at which the user laughed in the database. Even further, the media guidance application may store second identities of a second plurality of media assets consumed by the user in the data structure during a predetermined range of time adjacent to the first time. For example, the media guidance application may store in the database the identity of the song "Little Wing" by Jimi Hendrix, because it was consumed two minutes before the playback of "Purple Haze."

In some embodiments, the media guidance application may detect that the user consumed the media asset at a third time that is later than the first time. For example, the media guidance application may detect that the user was listening to "Purple Haze" one week later after he was listening to it in the car. Further, the media guidance application may detect a third reaction by the user to the media asset, while the media asset was consumed by the user at the third time. For example, the media guidance application may determine that the user reacted to the playback of "Purple Haze" one week after the user was listening to "Purple Haze" in the car. Even further, the media guidance application may, in response to detecting the third reaction, determine a type of the third reaction, convert a magnitude of the third reaction to a second converted magnitude on a scale that corresponds to the second type, and determine whether the second converted magnitude is greater than a threshold value on the second scale that corresponds to the second type. For example, the media guidance application may detect that the user laughed loudly enough while listening to "Purple Haze."

In some embodiments, the media guidance application may, in response to determining that the second converted magnitude is greater than the second threshold value on the second scale that corresponds to the second type, recommend a third media asset, to the user, based on the second identities of each of the second plurality of media assets. For example, the media guidance application may recommend that the user listen to the song "Little Wing" by song artist Jimi Hendrix, because "Little Wing" was played during the user's prom night after "Purple Haze."

In some embodiments, the media guidance application may, while recommending the third media asset to the user, based on the second identities of each of the second plurality of media assets, determine a type of the second reaction. For example, the media guidance application may determine that the second reaction is laughter. Further, the media guidance application may determine a type of the first reaction. Even further, the media guidance application may recommend the third media asset, to the user, based on the identities of each of the plurality of media assets, the second identities of each of the second plurality of media asset, the type of the first reaction, and the type of the second reaction. For example, the media guidance application may determine that the user was laughing both times while listening to "Purple Haze". Further, the media guidance application may recommend the song "Hey Joe" by the song artist Jimi Hendrix, to the user because "Hey Joe" was played after the playback of "Purple Haze" during the prom night.

In some embodiments, the media guidance application may, in response to finding, based on the searching, the entry indicating the second reaction by the user to the media asset at the second time, retrieve, based on information of the entry, identities of each of a plurality of media assets consumed by the user during a predetermined range of time adjacent to the second time. For example, the media guidance application may determine that the last time the user reacted, while listening to "Purple Haze," was during his prom night. The media guidance application may then retrieve the playlist that was playing at the user's prom night.

In some embodiments, the media guidance application may retrieve a plurality of media assets that correspond to the identities of each of the plurality of media assets. Further, the media guidance application may generate a playlist of media assets using the plurality of media assets. For example, the media guidance application may generate the playlist based on the songs that played during the prom night, when "Purple Haze" was played. Even further, the media guidance application may play back the plurality of media assets in the playlist. For example, the media guidance application may play back the playlist that played during the prom night, when "Purple Haze" was played.

In some embodiments, the media guidance application may recommend a second media asset to the user, based on the identities of each of the plurality of media assets. For example, the media guidance application may recommend "Hey Joe" by Jimi Hendrix, which was playing after the playback of "Purple Haze" during the user's prom night.

BRIEF DESCRIPTION

FIG. 8 depicts an illustrative flowchart of a process for generating a playlist based on current and previous reactions from the user, in accordance with some embodiments of the disclosure; and FIG. 9 depicts an illustrative flowchart of a process for recommending media assets based on detection of current and previous reactions from the user, in accordance with some embodiments of the disclosure.

DETAILED DESCRIPTION

Figure 1:
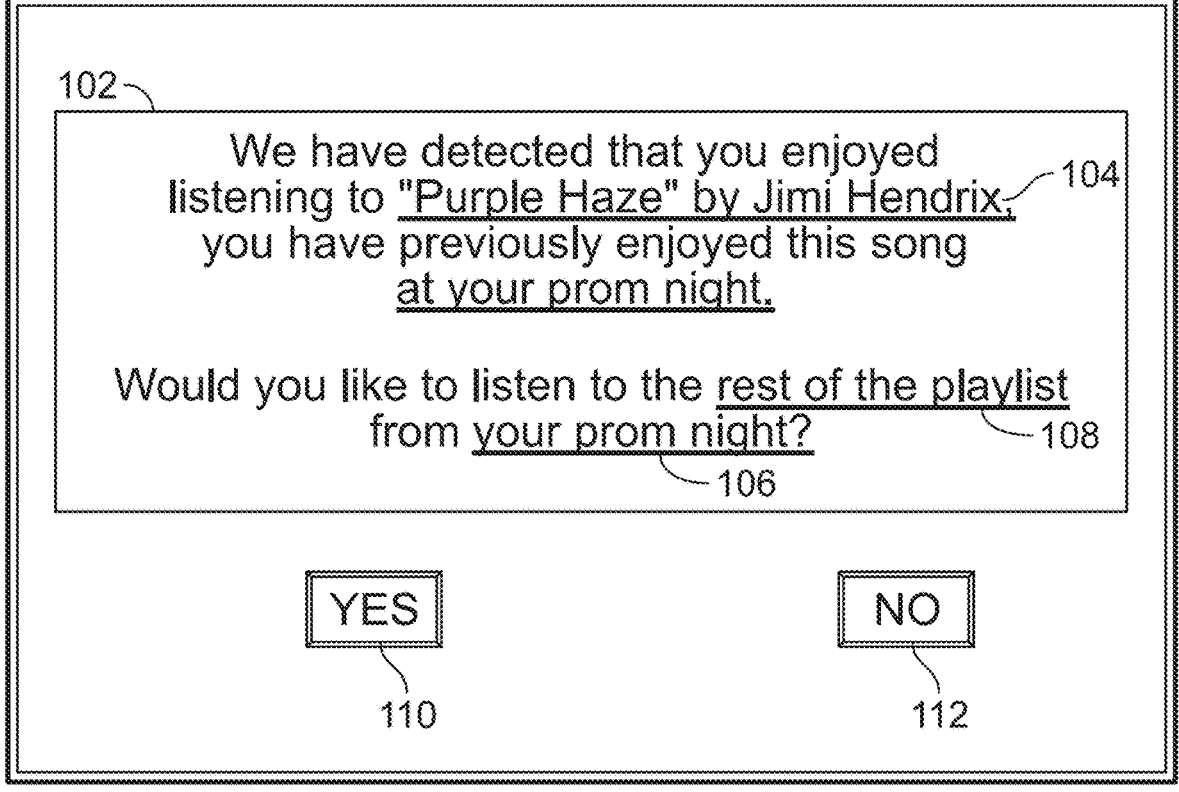
FIG. 1 depicts an illustrative embodiment of user equipment with a display that includes a media asset recommendation, in accordance with some embodiments of the disclosure.

FIG. 1 depicts an illustrative embodiment of user equipment with a display that includes a media asset recommendation, in accordance with some embodiments of the disclosure. As illustrated, FIG. 1 includes alert 102, media asset identifier 104, event 106, recommendation 108, option 110, and option 112.

The media guidance application may generate for display alert 102, which may inform the user that a reaction to a media asset corresponding to media asset identifier 104 was detected. Additionally, or alternatively, the media guidance application may use alert 102 to inform that the user previously reacted to the media asset at a time corresponding to event 106. The media guidance application may use alert 102 to recommend a second media asset corresponding to recommendation 108 to the user. It should be noted that event 106 can be optional in alert 102. The media guidance application may use alert 102 to present option 110 and/or option 112 to the user. The media guidance application may allow the user to accept recommendation 108 by selecting option 110 and/or reject recommendation 108 by selecting option 112. For example, the media guidance application may generate for display alert 102, notifying the user that he previously enjoyed the song "Purple Haze" by song artist Jimi Hendrix at his prom night and recommending the rest of the playlist from the prom night to the user.

As used herein, the term "alert" is defined to mean a notification, generated by the media guidance application, available to the user. An alert may be audio, visual, sensorial and the like. Examples of alerts are audio notifications, video notifications, vibrations and the like. As used herein, the term "media asset" is defined below with respect to FIG. 2-5.

As used herein, the term "event" means an occurrence that happened at the time when the user previously reacted to the media asset corresponding to media asset identifier 104. Examples of events are concerts, birthdays, weddings, trips, parties, sport events, location, conferences and the like. Further, an event may be an unusual or special encounter, such as a time and/or place where a user encounters one or more persons or objects that are meaningful to the person. For example, an event may occur at a time or place where the user meets a friend or a group of friend that he did not see in a long time. The media guidance application may determine whether an encounter is unusual or special based on information of the user's profile, such as a level of connection the user has to a friend (e.g., based on past interactions) or to a place. As used herein, the term "recommendation" means one or more media asset consumed near in time to the media asset corresponding to media asset identifier 104. Examples of recommendations are songs, movies, trailers, playlists, books, news articles, magazines, comic books, music videos, TV series, and the like.

In some embodiments, the media guidance application may detect that an event corresponding to event 106, at a second time, occurred by monitoring user's activity (e.g., social media posts, texts, emails, letters, calendars, chats, GPS location, user input). In some embodiments, the media guidance application may monitor the user's GPS location and/or itinerary (e.g., calendar entries, travel itineraries in the inbox, travel applications history) to determine a location associated with the user at the second time. For example, the media guidance application may store the location of the user at the second time in a database, cache, or local storage. The media guidance application may retrieve the location of the user at the second time from a database, cache, or local storage. Further, the media guidance application may specify the location as event 106 in alert 102. Other ways of establishing an event taking place at the second time are described below.

In some aspects, the media guidance application may detect that a user consumed a media asset corresponding to media asset identifier 102 at a first time. For example, in some embodiments, the media guidance application may detect consumption of the media asset by monitoring user equipment available to the user and detecting when a user selects the media asset for playback, or otherwise causes playback of the media asset. The media guidance application may continuously monitor user equipment available to the user, and the media guidance application may also use a plurality of sensors (e.g., a microphone, a camera) to determine if the user is located next to the user equipment that is distributing the media asset, and/or if the user is paying attention to the media asset.

For example, in some embodiments, the media guidance application may use a camera to verify if the user is located next to the user equipment distributing the media asset. The media guidance application may use an eye-tracking algorithm to check if the user's eyes are focused on the display to verify that the user is viewing a movie. If the media guidance application determines that the user is not located next to the user equipment or that the user is not paying attention to the media asset, the media guidance application may conclude that the user is not consuming the media asset, notwithstanding that the media asset is playing back in the presence of the user. The media guidance application may use a plurality of sensors (e.g., a microphone, a camera) to detect that the user is consuming a media asset. If the media guidance application detects an input from the sensors (e.g., the microphone detects a noise, the camera detects movement on the display), the media guidance application may query each of the devices available to the user to determine that the input from the sensor is due to a media asset being consumed and not due to ambient noise (e.g., a person speaking, a passing vehicle is blasting music).

In some embodiments, the media guidance application may detect a first reaction by the user to the media asset corresponding to media asset identifier 104, while the media asset was consumed by the user at the first time. For example, in some embodiments, the media guidance application may detect an input from a sensor (e.g., microphone) indicating a reaction from the user. In some embodiments, the media guidance application may use one sensor or a combination of multiple sensors to detect a first reaction by the user to the media asset.

As used herein, the term "reaction" means a user's response to the media asset that corresponds to media asset identifier 104. Examples of reactions are sweating, variation in body temperature, variation in heart rate, variation in breathing frequency, screaming, yelling, speech, laughing, singing, clapping, dancing, smiling, gesturing, grimacing, texting, and the like. The media guidance application may receive a user input indicating a reaction to the media asset. The user input can occur through user input interface 410, which is further described below with respect to FIG. 2-5. Examples of inputs from the user are: the user places the media asset into his preferred list, the user likes the media asset, the user buys, rents or downloads the media asset, the user comments on the media asset, the user sends a text message or posts on social media about the media asset, and the like.

As used herein, the term "sensor" means a device that detects and/or measures the reaction by the user to the media asset that corresponds to media asset identifier 104. Examples of sensors are passive infrared sensors, thermometers, thermocouples, thermistors, heart rate monitors, electrocardiogram (EKG), strapless heart rate monitors, infrared carbon dioxide sensors, chemical carbon dioxide sensors, microphones, absolute pressure sensors, sealed pressure sensors, video cameras, ultrasonic sensors, gesture detectors, and the like. Alternatively, as described above, the media guidance application may detect a reaction through a user's input.

In some embodiments, the media guidance application may detect the first reaction by the user to the media asset corresponding to media asset identifier 104 by analyzing a communication by the user at a later time. For example, in some embodiments, the media guidance application may receive the user's communication.

In some embodiments, the media guidance application may receive the metadata of the media assets corresponding to media asset identifier 104 and may determine based on the metadata the type of the media asset corresponding to media asset identifier 104. For example, the media guidance application may determine from the metadata of the movie "Superbad," that the movie is a comedy.

In some embodiments, the media guidance application may determine that the first reaction does not correspond to the type of the media asset corresponding to media asset identifier 104. For example, the media asset may determine that the user reacted with anger to "Superbad" and conclude that anger does not correspond to a comedy. Further, the media guidance application may disregard the first reaction. For example, the media guidance application may disregard the anger reaction to "Superbad."

As used herein, the term "communication" means an oral or written reaction by the user to the first media asset corresponding to media asset identifier 104. Examples of communication are speech, texting, posting in a chat, posting in a social network, sending an email, sending a letter, and the like.

In some embodiments, the media guidance application may be monitoring the user equipment available to the user and analyzing communications to detect the first reaction. The media guidance application may be listening to the user talking to detect the first reaction, or may monitor electronic communications of the user. For example, the media guidance application may be monitoring the user's communications through a social media platform (e.g., Facebook) and receive a communication, saying: "Yesterday I was at my friend's wedding. During the ceremony, I heard "Purple Haze" and it made me smile."

In some embodiments, the media guidance application may, once the communication is received, decompose the communication into segments. For example, in some embodiments, the media guidance application may decompose the written and/or oral communication into sentences, phrases, or individual words. The media guidance application may decompose the communication into equal segments or segments containing different amounts of information. For example, the media guidance application may split the social media post into the first sentence, "Yesterday I was at my friend's wedding," and the second sentence "During the ceremony, I heard "Purple Haze" and it made me smile."

In some embodiments, the media guidance application may detect the first reaction after analyzing one or more segments. The media guidance application may search for a set of keywords indicating emotions in the sentences. The keywords might be stored in a database, local storage or cache. Examples of keywords indicating emotions are like, hate, enjoy, awesome, great, yay, nay, dislike, love, lame, bogus, laugh, smile, clap, sing, emoticons indicating any of the above reactions, and the like. The media guidance application may search for a set of keywords indicating actions in the sentences. Examples of keywords indicating actions are listen, watch, view, hear, see, and the like. The media guidance application may search for a set of keywords indicating media assets in the sentences. Examples of keywords indicating media assets are song, movie, theater, play, spectacle, film, ad, and the like.

In some embodiments, the media guidance application may detect a keyword and may search the combinations of words in the sentence in a list of media assets to identify the media asset being consumed. The media guidance application may perform the above-mentioned analysis after identifying one or more keywords. For example, the media asset may analyze the second sentence and detect the word "heard," a keyword indicating actions, the word "song," a keyword indicating media assets, and "smile," a keyword indicating emotions. Further, the media guidance application may compare the word combination "Purple Haze" against a list of media assets and may conclude that the user is talking about the song "Purple Haze" by Jimi Hendrix. Finally, the media asset may conclude that the user heard the song "Purple Haze" and it made him smile, thus, the media guidance application may detect a reaction.

In some embodiments, the media guidance application may be monitoring the communication of the user to determine an event corresponding to event 106, that occurred at the second time. The media guidance application may be analyzing the communication in ways similar to the ones described above but may also search for keywords indicating events. Examples of keywords indicating events are concert, birthday, wedding, trip, party, sport event, location, conference, and the like. For example, the media guidance application may analyze the first sentence and detect the word "wedding", a keyword indicating an event. Thus, the media guidance application may conclude that the user heard "Purple Haze" at a wedding and the song made him smile.

In some embodiments, the media guidance application may be monitoring the communications of a group of users located in proximity to the user at the second time. For example, in some embodiments, the media guidance application may retrieve a range from a database, local storage, or cache. Further, the media guidance application may at the second time identify the group of people located within the range of the user. Further, the media guidance application may retrieve the communication of each of the members of the group of people and analyze the communication in ways similar to the ones described above. Other manners of collecting and understanding electronic communications of users within a range of an event are further described in greater details in Twyman et al. U.S. application Ser. No. 15/165,061, which is hereby incorporated by reference herein in its entirety.

In some embodiments, the media guidance application may, in response to detecting the first reaction, determine a type of the first reaction. Ways of determining the type of reaction based on the reaction are described below.

As used herein, the term "type of reaction" means a class of reaction by the user to the media asset corresponding to media asset identifier 104. Examples of types of reaction are biometric type, volume type, action type, facial type and the like. Examples of biometric type reaction are sweating, variation in body temperature, variation in heart rate, variation in breathing frequency, and the like. Examples of volume type reactions are screaming, yelling, speech, laughing, singing, and the like. Examples of action type reactions are clapping, dancing, gesturing, texting, and the like. Examples of facial type reactions are smiling, grimacing, winking, and the like.

In some embodiments, the media guidance application may, as part of determining the type of the first reaction, determine a sensor type based on a sensor used to detect the first reaction. For example, in some embodiments, the media guidance application may determine the sensor type as heart rate sensor because the sensor to detect the reaction was a heart rate monitor. The media guidance application may use a look-up table to determine the sensor type. The media guidance application may use a look-up table that has a sensor type value corresponding to each sensor, or each sensor type may have a list of sensors corresponding to it. The look-up table can be stored in a database, local storage or cache. For example, sensors like passive infrared sensors, thermometers, thermocouples, and thermistors are temperature sensor types. Sensors like infrared carbon dioxide sensors, and chemical carbon dioxide sensors are carbon dioxide sensor types. Sensors like microphones, absolute pressure sensors, and sealed pressure sensors are sound sensor types. Sensors like video cameras, ultrasonic sensors, and gesture detectors are motion sensor types.

As used herein, the term "sensor type" means a classification of a sensor used to detect the first reaction by the user to the media asset corresponding to the media asset identifier 104. Examples of sensor types are temperature sensors, heart rate sensors, carbon dioxide sensors, pressure sensors, motion sensors, and the like.

In some embodiments, the media guidance application may, once the sensor type is known, determine whether the sensor type corresponds to one reaction type, or to a plurality of candidate reaction types. For example, the media guidance application may determine, by using the look-up table mentioned above, that the heart rate sensor type only corresponds to a biometric reaction type, while an input coming from a sound sensor such as a pressure sensor can indicate volume or action types. The media guidance application may query a look-up table that would return the number of reaction types that correspond to the sensor type. For example, temperature sensors can detect biometric reaction types. Heart rate sensors can detect biometric reaction types. Carbon dioxide sensors can detect biometric reaction types. Sound sensors can detect volume or action types. Motion sensors can detect action types or facial types.

In some embodiments, the media guidance application may, in response to determining that the sensor type corresponds to one reaction type, determine the type of the first reaction based on the sensor type; thus, the media guidance application may determine the reaction type. For example, the media guidance application may determine that the sensor type is a heart rate sensor and may determine that the reaction type is a biometric reaction type. The media guidance application may use the above-mentioned look-up table to determine the reaction type.

However, in some embodiments, the media guidance application may determine that the sensor type corresponds to a plurality of candidate reaction types. In such embodiments, the media guidance application may detect, using a different sensor, other than the sensor used to detect the first reaction, the new reaction, by the user, to the media asset corresponding to media asset identifier 106, while the media asset was consumed by the user at the first time. The new reaction can be the same as the first reaction. Ways of detecting the new reaction have been described above in reference to the first reaction. For example, the media guidance application may detect the new reaction using a camera, while the first reaction was detected using a micro-phone.

In some embodiments, the media guidance application may, once the new reaction has been detected, determine the sensor type of the different sensor that was used to detect the new reaction. Ways of determining the sensor type of the different sensor have been described above in reference to the sensor. For example, the media guidance application may determine that the type of the different sensor is a motion sensor type, while the type of the sensor is a sound sensor type.

In some embodiments, the media guidance application may, once the type of the new sensor has been identified, determine the type of the first reaction, thus determining the type of the first reaction. In some embodiments, the media guidance application may use the above-mentioned look-up table to determine the reaction types that each sensor can detect. Further, the media guidance application may identify the type of the first reaction to be the reaction type that can be detected by both sensors. The media guidance application may use any number of sensors to determine the reaction type. For example, the media guidance application may determine, using the look-up table, that the sound sensor can determine volume type reactions and action type reactions. Further, the media guidance application may determine, using the look-up table, that the motion sensor type can determine action type reactions and facial type reactions. The media guidance application may conclude that the type of the first reaction is an action type because that is the only type of reaction that both the motion and sound type sensors can detect.

An alternative method to determine the type of the reaction if the sensor type corresponds to a plurality of candidate reaction types is described below. In such embodi-ments, the media guidance application may retrieve respec-tive characteristics that correspond to each candidate reac-tion type of the plurality of candidate reaction types. For example, in some embodiments, the media guidance appli-cation may determine that the sensor type is a sound sensor that can indicate a volume or action type reaction. The media guidance application may query a database for the respective characteristics. The media guidance application may query a local storage or a cache for the respective characteristics. The respective characteristics may be of a typical user or may be samples of the user's reaction.

In some embodiments, the media guidance application may, once the needed characteristics have been retrieved, compare characteristics of the first reaction to each respec-tive characteristic of each candidate reaction type to deter-mine a respective amount of matching characteristics for each respective candidate reaction type. For example, the media guidance application may compare the characteristics of the first reaction, received from a pressure sensor to the characteristics of samples of the user volume and action type. The media guidance application may use correlation functions to determine the amount of matching for each respective candidate reaction type. The media guidance application may compare the time characteristics and/or the frequency characteristics to determine the amount of match-ing for each respective candidate reaction type. The media guidance application may use the entire or only a portion of the first reaction to determine the amount of matching for each respective candidate reaction type.

In some embodiments, the media guidance application may determine the type of the first reaction to be the respective candidate reaction type that had the respective amount of matching characteristics that was a highest respective amount. For example, in some embodiments, the media guidance application may conclude that the first reaction matches a volume type reaction the best and thus determine the type of the first reaction to be a volume type. The media guidance application may store the amounts of matching in a table and then sort the table to determine the type of the first reaction that had the highest amount of matching. The media guidance application may keep the type with the current highest amount of matching in a variable; every time an amount of matching is determined the media guidance application may compare it with the amount of matching corresponding to the type that is cur-rently stored in the variable. The media guidance application may update the variable with the new type if the new amount of matching is higher than the amount of matching that corresponds to the type currently stored in the variable.

In some embodiments, the media guidance application may convert a magnitude of the first reaction to a converted magnitude on a scale that corresponds to the type. As described herein, the term "converted magnitude" means the magnitude on the scale that corresponds to the type. Examples of converted magnitudes are magnitudes relative to a normal response for the corresponding type, log scales, exponential scales, linear scales, non-linear scales, and the like.

In some embodiments, the media guidance application may, in order to convert the magnitude on a scale that corresponds to the type, take repeated measurements of the user's reactions and average them out in order to obtain a typical reaction. For example, the media guidance applica-tion may measure the temperature, heart rate, carbon diox-ide, sound levels, and motion speeds multiple times. Further, the media guidance application may average the multiple measurements to obtain a typical value for a user's reaction. The media guidance application may be using facial recog-nition algorithms to determine the user's typical facial characteristics by taking multiple pictures of the user's face and averaging them. The typical value can be stored locally or in a remote database.

In some embodiments, the media guidance application may, in order to convert the magnitude on a scale that corresponds to the type, subtract the typical value for a reaction type from the first reaction to obtain a relative reaction. The media guidance application can retrieve the typical reaction from a local or remote database. Further, in some embodiments, the media guidance application may divide the relative reaction by the typical reaction to convert to the converted magnitude. In some embodiments, the media guidance application may divide the relative reaction by the first reaction to convert to the converted magnitude. Examples of how the conversion is handled for different sensor and reaction types are listed below.

For example, in some embodiments, the media guidance application may convert the input of a temperature sensor to a temperature relative to the typical temperature for the user's body. For example, if the user's body temperature is detected to be 99.6 Fahrenheit, and the typical user's body temperature is 98.6 Fahrenheit, then the relative temperature may be +1 Fahrenheit. Further, the media guidance application may convert the relative temperature to a converted magnitude on a scale that corresponds to the type. For example, the media guidance application may divide the relative body temperature, +1 Fahrenheit, to the typical body temperature, 98.6 Fahrenheit, to obtain the converted magnitude that corresponds to the biometric reaction type. Other ways of obtaining the converted magnitude have been described above.

In some embodiments, the media guidance application may convert the input of a heart rate sensor to a heart rate relative to the typical heart rate for the user's body. For example, if the user's heart rate is detected to be 100 beats per minute, and the typical user's heart rate is 80 beats per minute, then the relative heart rate will be +20 beats per minute. Further, the media guidance application may convert the relative heartbeat to a converted magnitude on a scale that corresponds to the type. For example, the media guidance application may divide the relative heart rate, +20 beats per minute, to the typical heart rate, 80 beats per minute, to obtain the converted magnitude that corresponds to the biometric reaction type. Other ways of obtaining the converted magnitude have been described above.

In some embodiments, the media guidance application may convert the input of a carbon dioxide sensor to a carbon dioxide relative to the typical carbon dioxide level for the space occupied by the user (e.g., apartment, office, car, cubicle). For example, if the user's carbon dioxide is detected to be 1,500 parts per million (ppm), and the typical carbon dioxide level for the space occupied by the user is 1000 ppm, then the relative carbon dioxide level will be +500 ppm. Further, the media guidance application may convert the relative carbon dioxide level to a converted magnitude on a scale that corresponds to the type. For example, the media guidance application may divide the relative carbon dioxide level, +500 ppm, to the typical carbon dioxide level, 1000 ppm, to obtain the converted magnitude that corresponds to the biometric reaction type. Other ways of obtaining the converted magnitude have been described above.

In some embodiments, the media guidance application may convert the input of a sound sensor to a sound level relative to the typical sound level for the space occupied by the user (e.g., apartment, office, car, cubicle). For example, if the sound level is detected to be 30 decibels (dB), and the typical sound level is 20 dB, then the relative sound level will be +10 dB. Further, the media guidance application may convert the relative sound level to a converted magnitude on a scale that corresponds to the type. For example, the media guidance application may divide the relative sound level, +10 dB, to the typical sound level, 20 dB, to obtain the converted magnitude that corresponds to the volume reaction type. Other ways of obtaining the converted magnitude have been described above.

In some embodiments, the media guidance application may convert the input of a motion sensor to a motion speed relative to the typical motion speed for the user. For example, if the motion speed is detected to be 5 miles per hour, and the typical motion speed is 3 miles per hour, then the relative motion speed will be +2 miles per hour. Further, the media guidance application may convert the relative motion speed to a converted magnitude on a scale that corresponds to the type. For example, the media guidance application may divide the relative motion speed, +2 miles per hour, to the typical motion speed, 3 miles per hour, to obtain the converted magnitude that corresponds to the action reaction type. Other ways of obtaining the converted magnitude have been described above.

In some embodiments, the media guidance application may convert the input of a motion sensor to a set of facial characteristics relative to the typical facial characteristics for the user. For example, if the user's smile is detected to be 3 inches wide, and the typical user's smile is 2 inches wide, then the relative smile width will be +1 inch. Further, the media guidance application may convert the relative smile width to a converted magnitude on a scale that corresponds to the type. For example, the media guidance application may divide the relative smile width, +1 inch, to the typical smile width, 2 inches, to obtain the converted magnitude that corresponds to the facial reaction type. Other ways of obtaining the converted magnitude have been described above.

However, in some embodiments, the media guidance application may detect that the user was already exhibiting a previous reaction before the media asset corresponding to the media asset identifier 106 was consumed. For example, the media guidance application may determine that the user was already laughing even before the user started listening to "Purple Haze." Ways of detecting the previous reaction have been described above in reference to the first reaction.

In some embodiments, the media guidance application may, after determining that the user was exhibiting a previous reaction, retrieve the scale that corresponds to the type of the previous reaction. For example, the media guidance application may retrieve the typical value for the previous reaction type.

In some embodiments, the media guidance application may, in response to determining that the previous reaction occurred, adjust the scale based on the previous reaction and determining the converted magnitude of the first reaction using the adjusted scale. For example, in some embodiments, the media guidance application may use the magnitude of the previous reaction as the typical value.

As used herein, the term "adjusting the scale" means modifying the scale corresponding to the type of the reaction to account for a previous reaction by the user to the media asset corresponding to media asset identifier 104. Examples of adjusting the scale are adding, subtracting, multiplying, or dividing the magnitude of the third reaction from the magnitude of the first reaction, adding, subtracting, multiplying, or dividing the magnitude of the third reaction to the typical magnitude for the type of the reaction, replacing the typical magnitude with the magnitude of the third reaction, and the like.

In some embodiments, the media guidance application may detect the previous reaction to indicate that the temperature of the user's body is 99.1 Fahrenheit before the first reaction is detected. The media guidance application may set the new typical body temperature of the user to be 99.1 Fahrenheit, instead of 98.6 Fahrenheit.

In some embodiments, the media guidance application may detect the previous reaction to indicate that the user's heart rate is 90 beats per minute before the first reaction is detected. The media guidance application may set the new typical heart rate of the user to be 90 beats per minute, instead of 80 beats per minute.

In some embodiments, the media guidance application may detect the previous reaction to indicate that the carbon dioxide level in the space occupied by the user (e.g., office, apartment, car, cubicle) is 1250 ppm, before the first reaction is detected. The media guidance application may set the new typical carbon dioxide level of the space occupied by the user to be 1250 ppm, instead of 1000 ppm.

In some embodiments, the media guidance application may detect the previous reaction to indicate that the sound level in the space occupied by the user (e.g., office, apartment, car, cubicle) is 25 dB, before the first reaction is detected. The media guidance application may set the new typical sound level of the space occupied by the user to be 25 dB, instead of 20 dB.

In some embodiments, the media guidance application may detect the previous reaction to indicate that the motion speed of the user is 4 miles per hour, before the first reaction is detected. The media guidance application may set the new typical motion speed level of the user to be 4 miles per hour, instead of 3 miles per hour.

In some embodiments, the media guidance application may detect the previous reaction to indicate that the smile width of the user is 3 inches, before the first reaction is detected. The media guidance application may set the new typical smile width of the user to be 3 inches, instead of 2 inches.

In some embodiments, the media guidance application may then determine whether the converted magnitude is greater than a threshold value on the scale that corresponds to the type. For example, the media guidance application may determine that the laugh was loud enough to be considered a substantial reaction from the user. The media guidance application may retrieve the threshold value from a database, local storage, or cache. The media guidance application may compare the converted magnitude to the threshold value to determine if the converted magnitude is greater than the threshold value. In some embodiments, if the threshold value is equal to the converted magnitude, the media guidance application may determine that the converted magnitude is bigger than the threshold value. If the threshold value is equal to the converted magnitude, the media guidance application may determine that the converted magnitude is smaller than the threshold value. In some embodiments, if the threshold value is equal to the converted magnitude, the media guidance application may resolve conflict using a randomized choice. If the threshold value is equal to the converted magnitude, the media guidance application may attempt to resample the first reaction.

As used herein, the term "threshold value" means a minimum value for the reaction to be used for recommending the second media asset corresponding to recommendation 108. The threshold value can be different for each reaction type or the same for all reaction types. The threshold value can be stored in a database, local storage or cache. Examples of threshold values are integer numbers, rational numbers, irrational numbers, percent values, and the like.

In some embodiments, the media guidance application may, in response to determining that the converted magnitude is greater than the threshold value on the scale that corresponds to the type, search a database for an entry indicating a second reaction, by the user, to the media asset, at a second time that is earlier than the first time. For example, the media guidance application may search for a time in the past when the user reacted while listening to "Purple Haze." In some embodiments, the media guidance application may request the access to the database and then search the database for the second reaction. The media guidance application may send a query to the database specifying the media asset.

In some embodiments, the media guidance application may, in response to determining that the converted magnitude is greater than the threshold value on the scale that corresponds to the type, store the first reaction in a data structure. The media guidance application may store the first reaction in a database, local storage or cache.

In some embodiments, the media guidance application may store the first time in the data structure. For example, the media guidance application may store the time, at which the user laughed, in the database. The media guidance application may store the first time in a database, local storage or cache.

In some embodiments, the media guidance application may store second identities of a second plurality of media assets in the data structure, consumed by the user, during a predetermined range of time adjacent to the first time. In some embodiments, the media guidance application may retrieve the predetermined range of time from a database, local storage, or cache. In some embodiments, the media guidance application may compute the predetermined range of time adjacent to the first time by adding and/or subtracting the predetermined range of time from the first time. The media guidance application may store the second identities of a second plurality of media assets in the data structure in a database local storage, or cache. For example, the media guidance application may store in the database, the identity of the song "Little Wing" by Jimi Hendrix, because it was consumed two minutes before the playback of "Purple Haze."

Further, in some embodiments, the media guidance application may detect that the user consumed the media asset corresponding to media asset identifier 104 at a third time that is later than the first time. For example, the media guidance application may detect that the user was listening to "Purple Haze" one week after he was listening to it in the car. Ways of detecting that the user consumed the media asset at the third time have been described in reference to the first time.

Further, in some embodiments, the media guidance application may detect a third reaction by the user to the media asset, while the media asset was consumed by the user the third time. For example, the media guidance application may determine that the user reacted to the playback of "Purple Haze" one week after the user was listening to "Purple Haze" in the car. Ways of detecting the third reaction have been described above in reference to the first reaction.

In some embodiments, the media guidance application may, once the third reaction is detected, determine a type of the third reaction, convert a magnitude of the third reaction to a second converted magnitude on a scale that corresponds to the second type, and determine whether the second converted magnitude is greater than a threshold value on the second scale that corresponds to the second type. For example, the media guidance application may detect that the user laughed loudly enough while listening to "Purple Haze." Ways of converting the magnitude of the third reaction to a second converted magnitude on the scale that corresponds to the second type have been described above in reference to the first reaction. Ways of determining that the second converted magnitude is greater than the threshold value on the second scale that corresponds to the type have been described above in reference to the first reaction.

In some embodiments, the media guidance application may, in response to determining that the second converted magnitude is greater than the second threshold value on the second scale that corresponds to the second type, recommend a third media asset corresponding to recommendation 108 to the user, based on the second identities of each of the second plurality of media assets. For example, the media guidance application may recommend that the user listen to "Little Wing." The media guidance application may recommend the third media asset using alert 102. Ways of providing the recommendation have been described above in reference to FIG. 1.

In some embodiments, the media guidance application may, while recommending the third media asset to the user, based on the second identities of each of the second plurality of media assets, determine a type of the second reaction. For example, the media guidance application may determine that the second reaction is laughter. Ways of determining the type of the second reaction have been described above in reference to the first reaction.

In some embodiments, the media guidance application may determine a type of the first reaction. Ways of determining the type of the first reaction have been described above.

In some embodiments, the media guidance application may recommend the third media asset to the user, based on the identities of each of the plurality of media assets, the second identities of each of the second plurality of media asset, the type of the first reaction, and the type of the second reaction. For example, the media guidance application may determine that the user was laughing both times while listening to "Purple Haze". Further, the media guidance application may recommend "Hey Joe" to the user because "Hey Joe" was played after the playback of "Purple Haze" during the prom night corresponding to event 106. Ways of linking a time to an event have been described above in reference to FIG. 1. The media guidance application may compare the type of the first reaction to the type of the second reaction. If the types are opposite, the media guidance application may not recommend the third media asset user. It the types are the same or unrelated, the media guidance application may recommend the third media asset to the user.

In some embodiments, the media guidance application may, in response to finding, based on the searching, the entry indicating the second reaction by the user to the media asset corresponding to media asset identifier 104 at the second time corresponding to event 106, retrieve, based on information of the entry, identities of each of a plurality of media assets consumed by the user during a predetermined range of time adjacent to the second time. For example, the media guidance application may determine that the last time the user reacted, while listening to "Purple Haze," was during his prom night. The media guidance application may then retrieve the playlist that was playing at the user's prom night. The media guidance application may compute the range of times adjacent to the second time and query the database, a local storage, or cache for the identities of the plurality of media assets that were consumed by the user in that time period.

As used herein, the term "adjacent" means in a segment before or after an event. The adjacency can be temporal, special, and the like. For example, if an event occurred in a period of time adjacent to a second event, the event can occur before or after the second event. If a first media asset was consumed in a period of one hour adjacent to when the second media asset was consumed, and if the second media asset was consumed at 2 PM, the first media asset may been consumed at any time from 1 PM to 3 PM, that is, before or after the second media asset was consumed.

In some embodiments, the media guidance application may retrieve a plurality of media assets that correspond to the identities of each of the plurality of media assets. Ways of retrieving the plurality of media assets have been described above in reference to the identities of each of the plurality of media assets.

In some embodiments, the media guidance application may generate a playlist corresponding to recommendation 108 of media assets using the plurality of media assets. For example, the media guidance application may generate the playlist based on the songs that played during the prom night, when "Purple Haze" was played. The media guidance application may include all, some, or none of the plurality of media assets in the playlist. The media guidance application may include the entirety or segments of any of the plurality of media assets. The media guidance application may rearrange the plurality of media assets into any order or may keep the plurality of media assets in their original order when generating the playlist.

In some embodiments, the media guidance application may generate for playback the plurality of media assets in the playlist corresponding to recommendation 108. For example, the media guidance application may generate for playback the playlist that played during the prom night, when "Purple Haze" was played.

In some embodiments, the media guidance application may determine that the media asset corresponding to media asset identifier 104 was consumed with a group of users at a second time corresponding to event 106 by determining that the group of users was located close to the user at the second time corresponding to event 106. Ways of determining that the group of users was located in proximity to the user have been described above. Additionally, the media guidance application may determine that the group of users is located close to the user because their devices joined the same network. For example, the media guidance application may determine that the user is listening to "Purple Haze" together with his father or family because they are located close to each other or because their devices are all connected to the home Wi-Fi.

In some embodiments, the media guidance application may recommend the second media asset corresponding to recommendation 108 that the user consumed with the group of users. For example, the media guidance application may recommend "Hey Joe" to the user because he listened to "Hey Joe" together with his father or family.

In some embodiments, the media guidance application may recommend the second media asset corresponding to recommendation 108 to the user at a third time when a subset of the group of users is located close to each other. For example, the media guidance application may recommend "Hey Joe" next time the user and his father or part of the family get together.

In some embodiment, the media guidance application may recommend a segment of the media asset corresponding to recommendation 108 during which the second reaction occurred. For example, the media asset may recommend just the introduction of "Purple Haze" because that is when the user laughed.

In some embodiments, the media guidance application may recommend a second media asset corresponding to recommendation 108 to the user, based on the identities of each of the plurality of media assets. For example, the media guidance application may recommend "Hey Joe" by Jimi Hendrix, which was playing after the playback of "Purple Haze" during the user's prom night. The media guidance application may generate for display alert 102 to the user recommending the second media asset. The media guidance application may use the speakers to deliver the recommendation to the user. Ways of recommending the second media asset were described above in reference to FIG. 1. Ways of selecting the second media asset based on the identities of each of the plurality of media assets have been described above in reference to the playlist.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

In some embodiments, the media guidance application may embed a set of GPS data into an audio file for a music track. Further, the media guidance application may use the set of GPS data to create a playlist that is geographically relevant, personalized to the user, on-the-move, and/or pre-prepared playlist. The media guidance application may set the playlist to be aware of the user's location, the user's route, and the user's listening history. The media guidance application may include global geographical data and/or local geographical data in the set of GPS data. Examples of global geographical data are location where the media asset was recorded, locations mentioned in the media asset, locations where the media asset was performed, and the like. Examples of local geographical data are locations where the user first consumed the media asset, and the like. The media guidance application may include various options for customizing the playlist. Examples of options are location-specific options, era-specific options, genre-specific options, knowledge-specific options, and the like. Location-specific options allow the user to select the radius when providing recommendations, and the like. Era-specific options allow the user to select the year, decade associated with the media asset, and the like. Genre-specific options allow the user to select the genre of the media asset (e.g., jazz, rock, blues), and the like. Knowledge-specific options allow the user to select media assets known to the user, media assets unknown to the user, and the like.

In some embodiments, the media guidance application may create and stream a personalized playlist, based on location data and personal listening history, with no effort on the part of the user, while the user is walking through a particular location.

In some embodiments, the media guidance application may allow the user to select a location ahead of a trip to a particular location. The media guidance application may create a playlist specific to the selected location and take into consideration the user's preferences.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figures 2, 3:
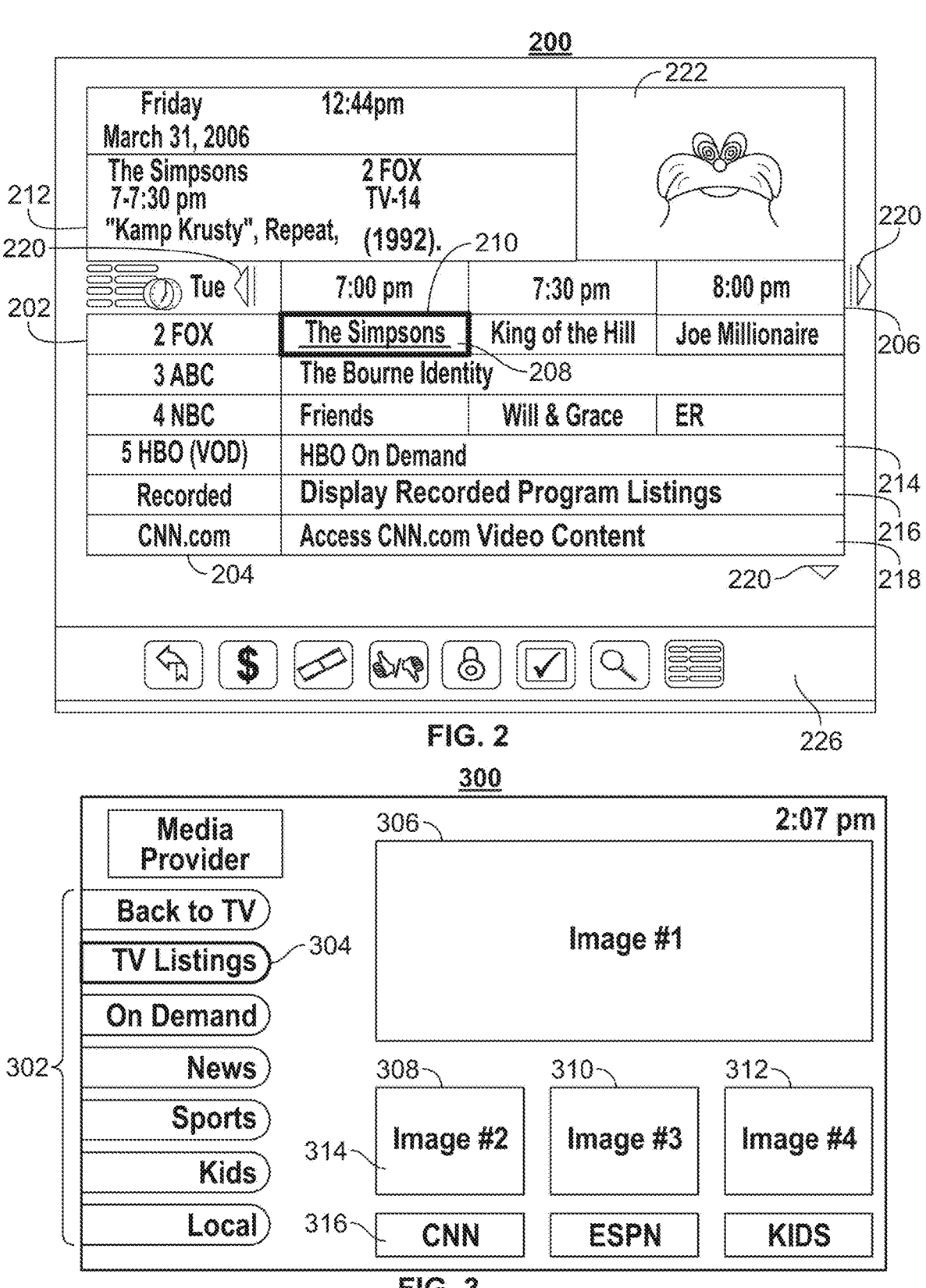
FIG. 2 shows an illustrative embodiment of a display screen that may be used to provide media guidance application listings and other media guidance information, in accordance with some embodiments of the disclosure.
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/ or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay 102, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figures 4, 5:
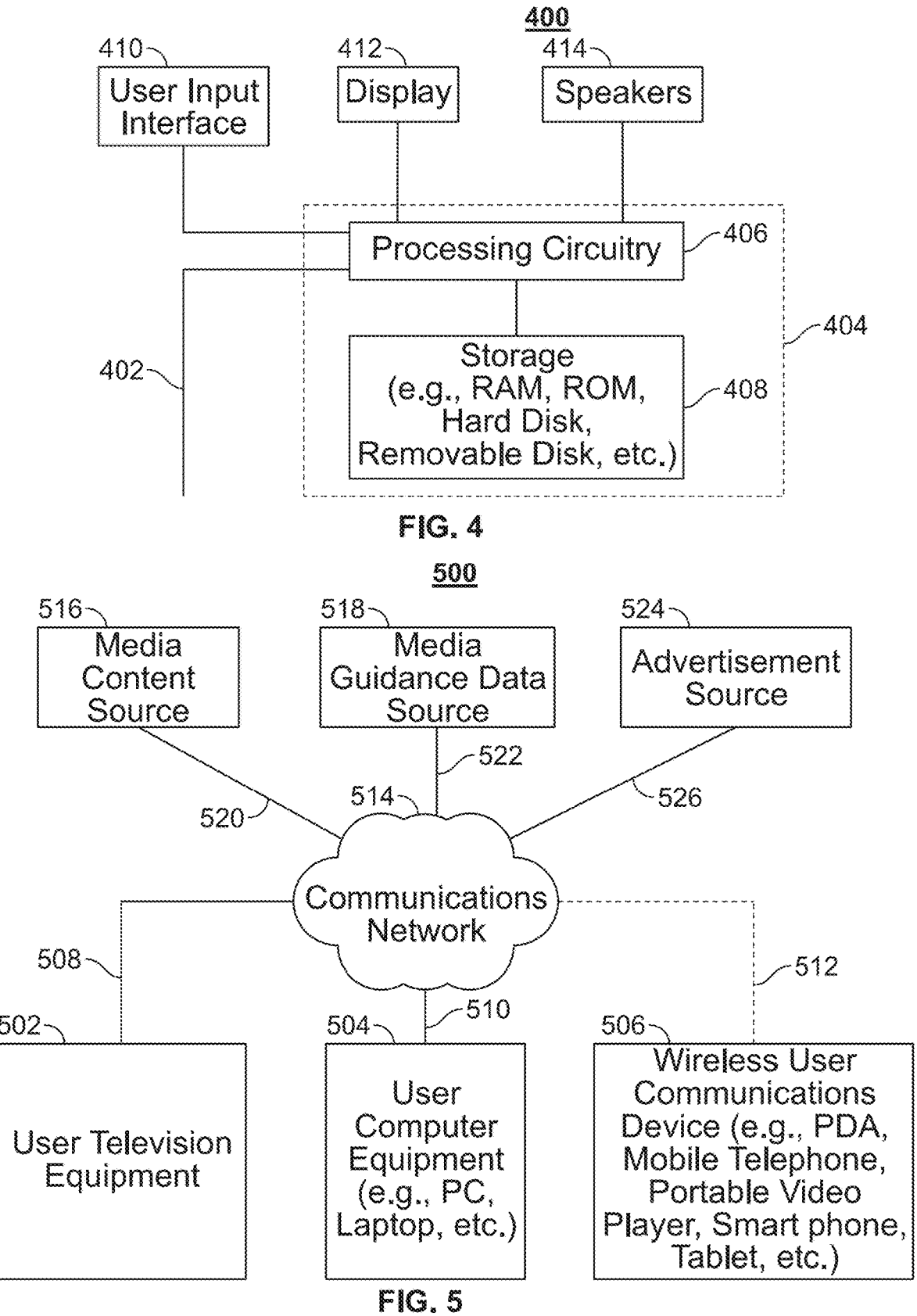
FIG. 4 is a block diagram of an illustrative user equipment (UE) device, in accordance with some embodiments of the disclosure.
FIG. 5 is a block diagram of an illustrative media system, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
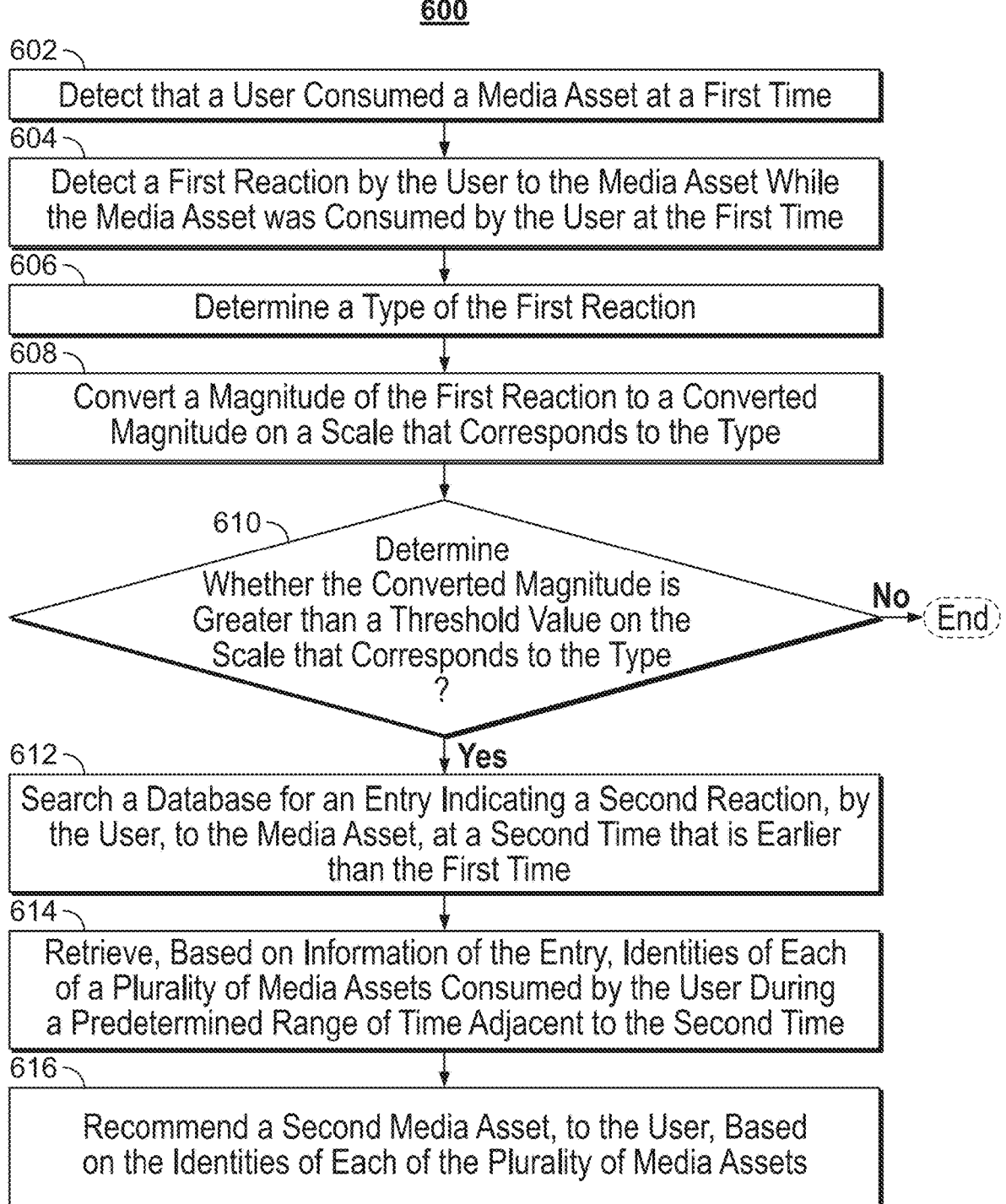
FIG. 6 depicts an illustrative flowchart of a process for recommending media assets based on determining current and previous reaction types from the user, in accordance with some embodiments of the disclosure.

FIG. 6 depicts an illustrative flowchart of a process for recommending media assets based on current and previous reactions from the user, in accordance with some embodiments of the disclosure. Process 600 may be executed by control circuitry 404 (e.g., in a manner instructed to control circuitry 404 by the media guidance application). Control circuitry 404 may be part of remote server separated from the user equipment by way of communications network 514.

Process 600 begins at 602, when control circuitry 404 detects that a user consumed a media asset corresponding to media asset identifier 104 at a first time. User input interface 410 can be used to detect that the user consumed the media asset at the first time, if the user liked the media asset, added it to his preference list, downloaded, rented, bought the media asset. For example, the media guidance application may determine that the user listened to "Purple Haze" by Jimi Hendrix as provided by the content source 516. Other ways to detect that the user consumed the media asset at the first time have been described above in reference to FIG. 1.

At 604, control circuitry 404 detects a first reaction by the user to the media asset corresponding to media asset identifier 104 while the media asset was consumed by the user at the first time. User input interface 410 can be used to detect the first reaction by the user to the media asset while the media asset was consumed by the user at the first time. For example, the media guidance application may detect an input from a microphone indicating a reaction from the user. Other ways to detect the first reaction by the user have been described above in reference to FIG. 1.

At 606, control circuitry 404 determines a type of the first reaction. Processing circuitry 406 can be used to determine the type of the first reaction. For example, the media guidance application may determine that the microphone registered the user laughing. Other ways to determine the type of the first reaction have been described above in reference to FIG. 1.

At 608, control circuitry 404 converts a magnitude of the first reaction to a converted magnitude on a scale that corresponds to the type. The scale can be retrieved from storage 408 or media guidance data source 518. Processing circuitry 406 can be used to convert the magnitude of the first reaction to the converted magnitude on the scale that corresponds to the type. For example, the media guidance application may convert the analog input of the sensor to a decibel scale to represent the loudness of the laugh. Other ways to convert the magnitude of the first reaction have been described above in reference to FIG. 1.

At 610, control circuitry 404 determines whether the converted magnitude is greater than a threshold value on the scale that corresponds to the type. The threshold can be retrieved from storage 408 or media guidance data source 518. Processing circuitry 406 can be used to determine whether the converted magnitude is greater than the threshold value on the scale that corresponds to the type. For example, the media guidance application may determine that the laugh was loud enough to be considered a substantial volume reaction from the user. Other ways to determine that the converted magnitude is greater than the threshold value on the scale that corresponds to the type have been described above in reference to FIG. 1.

If control circuitry 404 or processing circuitry 406 determine that the converted magnitude is not greater than the threshold value on the scale that corresponds to the type, process 600 ends.

If control circuitry 404 or processing circuitry 406 determine that the converted magnitude is greater than the threshold value on the scale that corresponds to the type, process 600 continues to 612. At 612, control circuitry 404 searches a database for an entry indicating a second reaction, by the user, to the media asset, at a second time corresponding to event 106 that is earlier than the first time. Processing circuitry 406 can be used to search a database for an entry indicating a second reaction, by the user, to the media asset, at a second time that is earlier than the first time. The database can be storage 408 or media guidance data source 518. For example, the media guidance application may search for a time in the past when the user reacted while listening to "Purple Haze." Other ways to search a database for an entry indicating the second reaction have been described above in reference to FIG. 1.

At 614, control circuitry 404 retrieves based on information of the entry, identities of each of a plurality of media assets consumed by the user during a predetermined range of time adjacent to the second time corresponding to event 106. The information of the entry can be retrieved from storage 408 or media guidance data source 518. Processing circuitry 406 can be used to retrieve, based on information of the entry, identities of each of a plurality of media assets consumed by the user during a predetermined range of time adjacent to the second time. For example, the media guidance application may determine that the last time the user reacted, while listening to "Purple Haze," was during his prom night. Other ways to retrieve the identities of each of the plurality of media assets have been described above in reference to FIG. 1.

At 616, control circuitry 404 recommends a second media asset corresponding recommendation 108 to the user, based on the identities of each of the plurality of media assets. Alert 102 will be displayed on display 412 to recommend the second media asset, to the user, based on the identities of each of the plurality of media assets. Alternatively, speakers 414 can be used to recommend the second media asset, to the user, based on the identities of each of the plurality of media assets. For example, the media guidance application may recommend "Hey Joe" by Jimi Hendrix which was playing after the playback of "Purple Haze" during the user's prom night. Other ways to recommend the second media asset to the user, have been described above in reference to FIG. 1.

Figure 7:
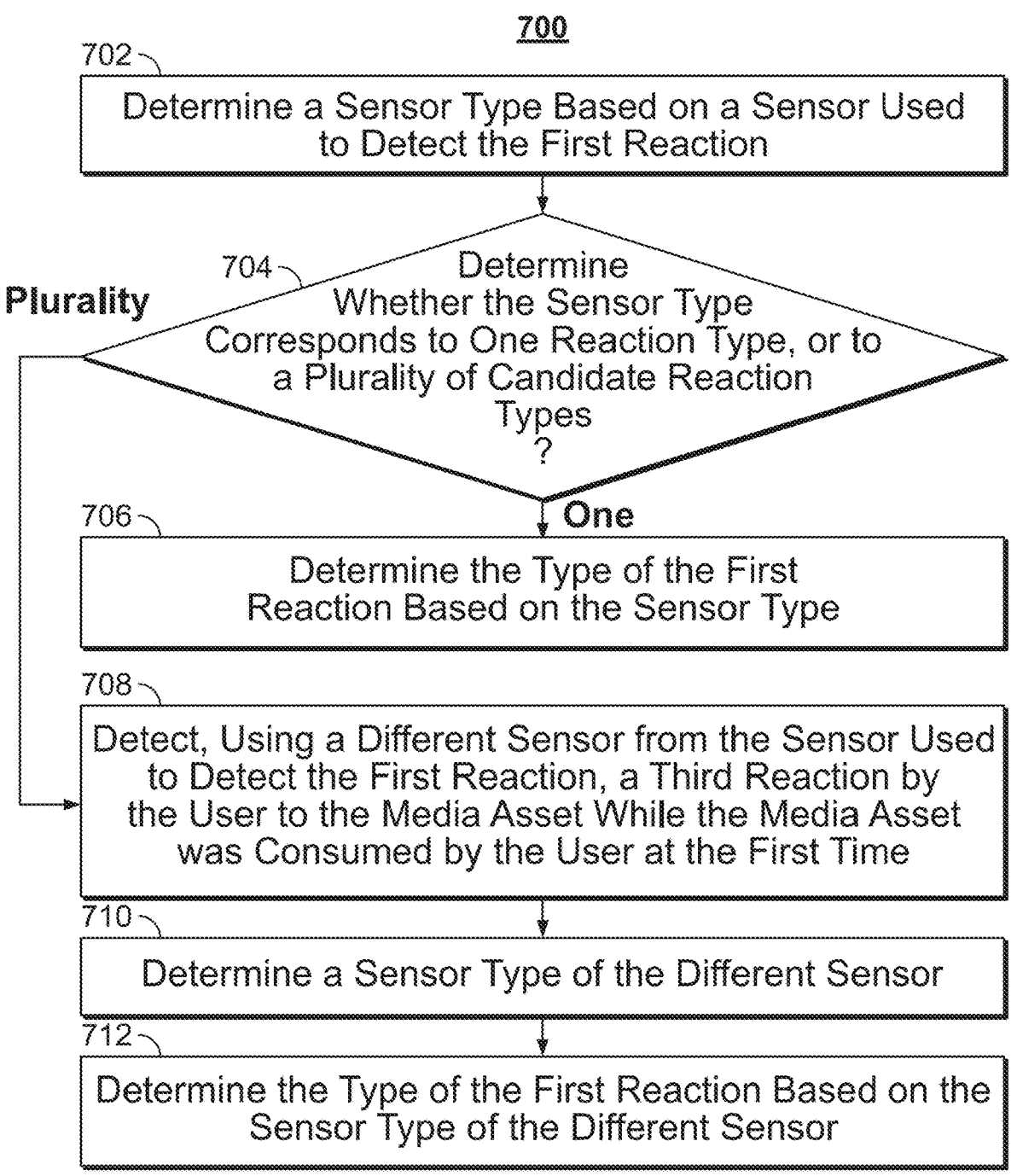
FIG. 7 depicts an illustrative flowchart of a process for determining a type of a reaction of a user to a media asset, in accordance with some embodiments of the disclosure.

FIG. 7 depicts an illustrative flowchart of a process for determining the type of a reaction, in accordance with some embodiments of the disclosure. Process 700 may be executed by control circuitry 404 (e.g., in a manner instructed to control circuitry 404 by the media guidance application). Control circuitry 404 may be part of remote server separated from the user equipment by way of communications network 514.

Process 700 begins at 702, when control circuitry 404 determines a sensor type based on a sensor used to detect the first reaction. The look-up table that can be used to determine the sensor type can be retrieved from storage 408 or media guidance data source 518. Processing circuitry 406 can be used to determine the sensor type based on the sensor used to detect the first reaction. For example, the media guidance application may determine the sensor type as heart rate sensor because the sensor to detect the reaction was a heart rate monitor. Other ways to determine the sensor type have been described above in reference to FIG. 1.

At 704, control circuitry 404 determines whether the sensor type corresponds to one reaction type, or to a plurality of candidate reaction types. Processing circuitry 406 can be used to determine whether the sensor type corresponds to one reaction type, or to the plurality of candidate reaction types. For example, the media guidance application may determine that the heart rate sensor only corresponds to a biometric reaction type, while an input coming from a pressure sensor can indicate volume or action type reactions.

If control circuitry 404 or processing circuitry 406 determine that the sensor type corresponds to one reaction type, process 700 continues to 706. Control circuitry 404 determines the type of the first reaction based on the sensor type. Processing circuitry 406 can be used to determine the type of the first reaction based on the sensor type. For example, the media guidance application may determine that the sensor type is a heart rate sensor and may conclude that the reaction type is a biometric reaction type.

If control circuitry 404 or processing circuitry 406 determine that the sensor type corresponds to the plurality of candidate reaction types, process 700 continues to 708. Control circuitry 404 detects, using a different sensor from the sensor used to detect the first reaction, a third reaction by the user to the media asset while the media asset was consumed by the user at the first time. Processing circuitry 406 can be used to detect, using the different sensor from the sensor used to detect the first reaction, the third reaction by the user to the media asset while the media asset was consumed by the user at the first time. Other ways to detect the third reaction type have been described above in reference to FIG. 1.

At 710, control circuitry 404 determines a sensor type of the different sensor. Processing circuitry 406 can determine the sensor type of the different sensor. For example, the media guidance application may determine the sensor type as heart rate sensor because the sensor to detect the reaction was a heart rate monitor. Other ways to determine the sensor type based on the sensor have been described above in reference to FIG. 1.

At 712, control circuitry 412 determines the type of the first reaction based on the sensor type of the different sensor. Processing circuitry 412 can determine the type of the first reaction based on the sensor type of the different sensor. For example, the media guidance application may determine based on the sensor type being pressure sensor and the different sensor type being motion sensor, that the reaction is of action type.

FIG. 8 depicts an illustrative flowchart of a process for generating a playlist corresponding to recommendation 108 based on current and previous reactions from the user, in accordance with some embodiments of the disclosure. Process 800 may be executed by control circuitry 404 (e.g., in a manner instructed to control circuitry 404 by the media guidance application). Control circuitry 404 may be part of a remote server separated from the user equipment by way of communications network 514.

At 802, control circuitry 404 searches a database for an entry indicating a reaction, by the user, to a media asset corresponding to media asset identifier 104 at a first time. The database can be storage 408 or media guidance data source 518. Processing circuitry 406 can be used to search a database for an entry indicating a reaction, by the user, to a media asset, at a first time. For example, the media guidance application may search for a time in the past when the user reacted while listening to "Purple Haze." Other ways to search a database for the entry indicating the reaction have been described above in reference to FIG. 1.

At 804, control circuitry 404 retrieves, from media guidance data source 518 or storage 408, based on information of the entry, identities of each of a plurality of media assets consumed by the user during a predetermined range of time adjacent to the first time. Processing circuitry 406 can be used to retrieve, based on information of the entry, identities of each of a plurality of media assets consumed by the user during a predetermined range of time adjacent to the first time. For example, the media guidance application may determine that the last time the user reacted, while listening to "Purple Haze," was during his prom night. Other ways to retrieve the identities of each of the plurality of media assets have been described above in reference to FIG. 1.

At 806, control circuitry 404 retrieves, from media content source 516, a plurality of media assets that correspond to the identities of each of the plurality of media assets. Processing circuitry 406 can be used to retrieve a plurality of media assets that correspond to the identities of each of the plurality of media assets. Other ways to retrieve the plurality of media assets have been described above in reference to FIG. 1.

At 808, control circuitry 404 generates a playlist of media assets corresponding to recommendation 108 using the plurality of media assets. Processing circuitry 406 can be used to generate a playlist of media assets using the plurality of media assets. Other ways to generate a playlist of media assets have been described above in reference to FIG. 1.

At optional step 810, control circuitry 404 finds a second entry indicating a negative reaction, by the user, to a second media asset, from the plurality of media assets, at a second time that is earlier than the first time. The second entry can be found in storage 408 or media guidance data source 518. Processing circuitry 406 can be used to find a second entry indicating a negative reaction, by the user, to a second media asset, from the plurality of media assets, at a second time that is earlier than the first time. For example, the media guidance application may determine that the user reacted with anger to the last time he listened to "Hey Joe." The media guidance application may identify a negative reaction as a reaction whose type is stored in a look-up table.

At optional step 812, control circuitry 404 removes the second media asset from the playlist. Processing circuitry 406 can be used to remove the second media asset from the playlist. For example, the media guidance application may remove "Hey Joe" from the playlist. The media guidance application may delete the second media asset from the playlist.

At 814, speaker 400 plays back the plurality of media assets in the playlist. For example, the media guidance application may play the songs that played at the prom night, excluding "Hey Joe", back to the user. Other ways to play back the plurality of media assets have been described above in reference to FIG. 1.

FIG. 9 depicts an illustrative flowchart of a process for recommending media assets based on current and previous reactions from the user, in accordance with some embodiments of the disclosure. Process 900 may be executed by control circuitry 404 (e.g., in a manner instructed to control circuitry 404 by the media guidance application). Control circuitry 404 may be part of a remote server separated from the user equipment by way of communications network 514.

Process 900 begins at 902, when control circuitry 404 detects a first reaction by a user when consuming a media asset corresponding to media asset identifier 104 and retrieved from media content source 516 at a first time, wherein a first magnitude of the first reaction exceeds a first threshold. User input interface 410 can be used to detect a first reaction by a user when consuming a media asset at a first time, wherein a first magnitude of the first reaction exceeds a first threshold. Other ways to detect the first reaction have been described above in reference to FIG. 1.

At 904, control circuitry 404 determines whether a second reaction by the user occurred when the user consumed the media asset corresponding to media asset identifier 104 at a second time corresponding to event 106 that is prior to the first time, wherein a second magnitude of the second reaction exceeds a second threshold. The second reaction can found in storage 408 or media guidance data source 518. Processing circuitry can be used to determine whether a second reaction by the user occurred when the user consumed the media asset at a second time that is prior to the first time, wherein a second magnitude of the second reaction exceeds a second threshold. Other ways to determine whether the second reaction by the user occurred when the user consumed the media asset at the second time have been described above in reference to FIG. 1.

At 906, control circuitry 404 recommends the second media asset to the user. Processing circuitry 406 can be used to recommend the second media asset to the user. Other ways to recommend the second media asset to the user have been described above in reference to FIG. 1.

It should be noted that processes 600-900 or any step thereof could be performed on, or provided by, any of the devices shown in FIGS. 2-5. For example, any of processes 600-900 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-900 may be incorporated into or combined with one or more steps of any other process or embodiment.

It is contemplated that the steps or descriptions of each of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-5 could be used to perform one or more of the steps in FIGS. 6-9.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:

providing a first content item for consumption by at least a first user and a second user a during a first session, wherein the first user and the second user are identified as being physically proximate to each other during the first session based at least in part on wireless signals received from a first device of the first user and a second device of the second user;

recording, based at least in part on first sensor data, a first positive reaction for at least one of the first user or the second user while the first content item is provided during the first session;

providing a second content item for consumption by at least the first user and the second user during the first session;

storing in memory an indication that, during the first session, the second content item was provided for consumption by at least the first user and the second user after detecting the first positive reaction to the first content item;

determining, during a second session after the first session, the first content item is being provided for consumption by at least the first user and the second user, wherein the first user and the second user are identified as being physically proximate to each other during the second session;

detecting, based at least in part on second sensor data, a second reaction for at least one of the first user or the second user while the first content item is provided for consumption in the second session; and providing, based at least in part on (i) the second reaction matching the first positive reaction and (ii) the stored indication, the second content item for consumption by at least the first user and the second user during the second session.

2. The method of claim 1, wherein the identifying the first user and the second user as being physically proximate to each other further comprises:

identifying a first location for the first device and a second location for the second device, based at least in part on the wireless signals; and determining that the first location for the first device and the second location for the second device are within a threshold proximity of each other.

3. The method of claim 2, wherein providing the first content item for consumption by at least the first user and the second user as part of the second session is based at least in part on:

determining, during the second session, that locations for the first device and the second device are within a threshold proximity of each other.

4. The method of claim 1, wherein the determining that the first user and the second user are physically proximate to each other further comprises:

determining, based at least in part on the wireless signals, that each of the first device and the second device is connected to the same network.

5. The method of claim 4, further comprising:

determining that the first user and the second user are physically proximate to each other during the second session by:

determining, during the second session that wireless signals received from the first device and the second device indicate that each of the first device and second device is connected to the same network.

6. The method of claim 1, wherein the providing, based at least in part on the second reaction matching the first positive reaction, the second content item for consumption comprises:

identifying a first type of the first positive reaction;

identifying a second type of the second reaction and a magnitude of the second reaction;

determining whether the second type is of a similar type to the first type; and in response to determining that the second type is of a different type as the first positive reaction, determining the magnitude is greater than a threshold magnitude associated with the different type.

7. The method of claim 1, wherein the providing, based at least in part on the second reaction matching the first positive reaction, the second content item for consumption comprises:

identifying a first magnitude of the first positive reaction;

identifying a second magnitude of the second reaction; and determining the first magnitude and the second magnitude is of a similar magnitude.

8. The method of claim 1, wherein the first positive reaction and the second reaction is a biometric response determined based on biometric sensor data detected by one or more biometric sensors, the biometric sensor data being indicated in the first sensor data and the second sensor data.

9. The method of claim 1, further comprising:

retrieving a plurality of content items associated with the first content item and the second content item; and providing the plurality of content items for consumption by at least the first user and the second user during the second session.

10. The method of claim 1, further comprising:

retrieving a plurality of content items associated with the first content item and the second content item;

detecting a third reaction while a third content item from the plurality of content items is provided during the first session;

determining that the third reaction comprises a negative sentiment;

modifying the plurality of content items by removing the third content item from the plurality of content items; and providing the modified plurality of content items for consumption by at least the first user and the second user during the second session, wherein the third content item is removed from the plurality of content items.

11. A system comprising:

memory; and control circuitry configured to:

provide a first content item, from the memory, for consumption by at least a first user and a second user during a first session, wherein the first user and the second user are identified as being physically proximate to each other during the first session based at least in part on wireless signals received from a first device of the first user and a second device of the second user;

record, based at least in part on first sensor data, a first positive reaction for at least one of the first user or the second user while the first content item is provided during the first session;

provide a second content item, from memory, for consumption by at least the first user and the second user during the first session;

store in the memory an indication that, during the first session, the second content item was provided for consumption by at least the first user and the second user after detecting the first positive reaction to the first content item;

determine, during a second session after the first session, the first content item is being provided for consumption by at least the first user and the second user, wherein the first user and the second user are identified as being physically proximate to each other during the second session;

detect, based at least in part on second sensor data, a second reaction for at least one of the first user or the second user while the first content item is provided for consumption in the second session; and provide, based at least in part on (ii the second reaction matching the first positive reaction and (ii) the stored indication, the second content item for consumption by at least the first user and the second user during the second session.

12. The system of claim 11, wherein the control circuitry configured to identify the first user and the second user as being physically proximate to each other is configured to:

identify a first location for the first device and a second location for the second device, based at least in part on the wireless signals; and determine that the first location for the first device and the second location for the second device are within a threshold proximity of each other.

13. The system of claim 12, wherein the control circuitry that provides the first content item for consumption during the second session by at least the first user and the second user is further configured to:

determine, during the second session, that locations for the first device and the second device are within a threshold proximity of each other.

14. The system of claim 11, wherein the control circuitry configured to determine that the first user and the second user are physically proximate to each other is configured to:

determine, based at least in part on the wireless signals, that each of the first device and the second device is connected to the same network.

15. The system of claim 14, wherein the control circuitry is further configured to:

determine that the first user and the second user are physically proximate to each other during the second session by:

determining, during the second session that wireless signals received from the first device and the second device indicate that each of the first device and second device is connected to the same network.

16. The system of claim 11, wherein the control circuitry configured to provide, based at least in part on the second reaction matching the first positive reaction, the second content item for consumption is configured to:

identify a first type of the first positive reaction;

identify a second type of the second reaction and a magnitude of the second reaction;

determine whether the second type is of a similar type to the first type; and in response to determining that the second type is of a different type as the first positive reaction, determine the magnitude is greater than a threshold magnitude associated with the different type.

17. The system of claim 11, wherein the control circuitry configured to provide, based at least in part on the second reaction matching the first positive reaction, the second content item for consumption is configured to:

identify a first magnitude of the first positive reaction;

identify a second magnitude of the second reaction; and determine the first magnitude and the second magnitude is of a similar magnitude.

18. The system of claim 11, wherein the first positive reaction and the second reaction is a biometric response determined based on biometric sensor data detected by one or more biometric sensors, the biometric sensor data being indicated in the first sensor data and the second sensor data.

19. The system of claim 11, wherein the control circuitry is further configured to:

retrieve a plurality of content items associated with the first content item and the second content item; and provide the plurality of content items for consumption by at least the first user and the second user during the second session.

20. The system of claim 11, wherein the control circuitry is further configured to:

retrieve a plurality of content items associated with the first content item and the second content item;

detect a third reaction while a third content item from the plurality of content items is provided during the first session;

determine that the third reaction comprises a negative sentiment;

modifying the plurality of content items by removing the third content item from the plurality of content items; and provide the modified plurality of content items for consumption by at least the first user and the second user during the second session, wherein the third content item is removed from the plurality of content items.

* * * * *